United States Patent [19]

Miskel, Jr. et al.

[11] Patent Number: 5,444,127
[45] Date of Patent: Aug. 22, 1995

[54] TERTIARY AMINE DERIVATIVES AS COMPONENTS OF POLYMER FORMING SYSTEMS

[75] Inventors: John J. Miskel, Jr., Mendham, N.J.; Reuben H. Grinstein, Blue Bell; Stephen A. Fischer, Yardley, both of Pa.

[73] Assignee: Henkel Corporation, Plymouth Meeting, Pa.

[21] Appl. No.: 120,625

[22] Filed: Sep. 13, 1993

Related U.S. Application Data

[63] Continuation-in-part of Ser. No. 963,789, Oct. 19, 1992, abandoned.

[51] Int. Cl.⁶ .................... C08G 59/42; C08G 59/50
[52] U.S. Cl. ........................ 525/504; 528/52; 528/53; 528/90; 528/93; 528/109; 528/123; 528/369; 528/390; 528/407
[58] Field of Search ................. 528/90, 93, 109, 123, 528/52, 53, 369, 390, 407; 525/504

[56] References Cited

U.S. PATENT DOCUMENTS

| | | | |
|---|---|---|---|
| 2,203,504 | 6/1938 | Piggott et al. | 260/294 |
| 2,220,508 | 4/1939 | Bock et al. | 91/70 |
| 2,326,721 | 8/1943 | Bruson | 260/461 |
| 2,642,412 | 8/1953 | Newey et al. | 260/47 |
| 2,752,323 | 7/1956 | Farnham | 260/47 |
| 2,855,372 | 10/1958 | Jenkins et al. | 260/18 |
| 2,965,672 | 12/1960 | Lott | 260/472 |
| 3,073,787 | 1/1963 | Krakler | 260/2.5 |
| 3,081,310 | 3/1963 | Rorig | 260/294.3 |
| 3,091,595 | 5/1963 | Mika | 260/18 |
| 3,143,566 | 8/1964 | Surrey | 260/490 |
| 3,234,153 | 2/1966 | Britain | 260/2.5 |
| 3,242,389 | 3/1966 | Moller et al. | 260/2.5 |
| 3,258,495 | 6/1966 | LeFave et al. | 260/609 |
| 3,294,749 | 12/1966 | Pratt | 260/47 |
| 3,385,809 | 5/1968 | Wiltgen, Jr. et al. | 260/18 |
| 3,386,955 | 6/1968 | Nawakowski et al. | 260/47 |
| 3,386,956 | 6/1968 | Nawakowski et al. | 260/47 |
| 3,419,525 | 12/1968 | Aelony | 260/47 |
| 3,446,771 | 5/1969 | Matsubayashi et al. | 260/45.85 |
| 3,496,119 | 2/1970 | Weller et al. | 260/2 |
| 3,496,142 | 2/1970 | Clelford et al. | 260/47 |
| 3,562,215 | 2/1971 | Moore | 260/47 |
| 3,655,818 | 4/1972 | McKown | 260/837 |
| 3,694,510 | 9/1972 | Moller et al. | 260/584 |
| 3,734,889 | 5/1973 | Lipowski et al. | 260/77.5 |
| 3,759,914 | 9/1973 | Simms et al. | 260/37 |
| 3,929,927 | 12/1975 | Marans et al. | 260/837 |
| 3,983,252 | 9/1976 | Buchalter | 424/333 |
| 4,002,598 | 1/1977 | Waddill et al. | 260/47 |
| 4,007,140 | 2/1977 | Ibbotson | 260/2.5 |
| 4,014,954 | 3/1977 | Gude et al. | 260/830 |

(List continued on next page.)

FOREIGN PATENT DOCUMENTS

| | | |
|---|---|---|
| 961029 | 9/1957 | Germany . |
| 1770814 | 3/1962 | Germany . |
| 362526 | 6/1992 | Switzerland . |

OTHER PUBLICATIONS

Chemical Abstracts, vol. 50, 15582i.
Chemical Abstract, vol. 52, 13807f.
Chemical Abstract, vol. 53, 20067h.
Chemical Abstract, vol. 55, 10412e.

(List continued on next page.)

Primary Examiner—Frederick Krass
Attorney, Agent, or Firm—Wayne C. Jaeschke; John Daniel Wood; Daniel S. Ortiz

[57] ABSTRACT

Curable systems for the preparation of polymeric products in which the curable system comprises an epoxy resin or an isocyanate, wherein the system contains a condensation reaction product of a) a polyamine having only one primary amino group and only one tertiary amino group, and a non-cyclic backbone containing from 1 to 18 carbon atoms; and b) at least one of urea, guanidine, guanylurea, thiourea, and a mono-N,N' alkyl substituted urea or thiourea having from 1 to 3 carbon atoms in the alkyl moieties.

11 Claims, No Drawings

U.S. PATENT DOCUMENTS

| | | | |
|---|---|---|---|
| 4,036,795 | 7/1977 | Tominaga | 260/18 |
| 4,049,591 | 9/1977 | McEntire et al. | 260/2.5 |
| 4,051,195 | 12/1977 | McWhorter | 260/837 |
| 4,070,334 | 1/1978 | Green | 260/42.53 |
| 4,088,614 | 5/1978 | Mori et al. | 260/2.5 |
| 4,110,358 | 8/1978 | Brauwarth | 260/404.5 |
| 4,122,128 | 10/1978 | Lehmann | 262/837 |
| 4,129,490 | 12/1978 | Schimmel | 204/181 |
| 4,129,556 | 12/1978 | Zonder et al. | 528/97 |
| 4,163,098 | 7/1979 | Zondler et al. | 528/99 |
| 4,177,173 | 12/1979 | Carr | 260/18 |
| 4,201,854 | 5/1980 | Zondler et al. | 528/121 |
| 4,283,520 | 8/1981 | Moser et al. | 528/93 |
| 4,324,739 | 4/1982 | Zondler et al. | 260/465.4 |
| 4,352,913 | 10/1982 | Zondler et al. | 525/504 |
| 4,547,562 | 10/1985 | Nichols | 528/119 |
| 4,882,216 | 11/1989 | Takimoto et al. | 525/507 |
| 5,138,018 | 8/1992 | Tashiro et al. | 528/111 |
| 5,200,494 | 4/1993 | Kubota et al. | 528/111 |

OTHER PUBLICATIONS

*Chemical Abstract*, vol. 71, 40157d.
*Chemical Abstract*, vol. 81, 78662j.
*Chemical Abstract*, vol. 47, 9056h.
*Chemical Abstract*, vol. 93, 98276n.

TERTIARY AMINE DERIVATIVES AS COMPONENTS OF POLYMER FORMING SYSTEMS

CROSS-REFERENCE TO RELATED APPLICATIONS

This application is a continuation-in-part of U.S. application Ser. No. 07/963,789, filed Oct. 19, 1992, now abandoned.

BACKGROUND OF THE INVENTION

1. Field of the Invention

This invention relates to polymer forming systems, and more particularly to curable systems containing an epoxy resin or an isocyanate.

2. Description of Related Art

Curable systems containing an epoxy resin or an isocyanate, e.g. epoxy adhesive or coating compositions and urethane compositions for producing polyurethane coatings, foams, and the like are well known to the art. Such curable systems contain a curing agent that reacts with the epoxy resin or isocyanate to form the polymeric product. In addition, catalysts and/or accelerators may also be present in these systems.

Curing agents for curable systems containing epoxy resins include mercaptans and amines. For example, U.S. Pat. No. 4,547,562 discloses the use of mono, di or poly amines, amine-terminated structures, or an adduct of mono, di or polyamines with mono, di or polyfunctional acrylates or epoxides as curing agents for epoxy resin systems. U.S. Pat. No. 4,051,195 discloses aliphatic polyamine curing agents for epoxy resins. U.S. Pat. No. 4,177,173 discloses the use of polymercaptans in a curing system for curing polyepoxides that also includes a poly ((N,N-dimethylamino)alkyl) ether catalyst.

Catalysts known for use in curable epoxy resin and isocyanate systems include certain amines and polyamines. For example, 3-(2-(dimethylamino)ethoxy)-1-N,N-dimethyl amino propane (sold by the Texaco Company as THANCAT®-DD) is promoted for use as a catalyst in both epoxy resin systems and urethane systems.

U.S. Pat. No. 3,734,889 discloses aminoplast polymers useful as flocculents, drainage aids, and dry strength resins in paper manufacture. These aminoplast polymers are formed by the reaction of I) a condensation product of a polyamine having only one primary amino group and only one tertiary amino group and a difunctional reactant, and II) a dihalogenated hydrocarbon ether.

DESCRIPTION OF THE INVENTION

Other than in the operating examples, or where otherwise indicated, all numbers expressing quantities of ingredients or reaction conditions used herein are to be understood as modified in all instances by the term "about".

It has now been discovered that certain tertiary amine intermediates disclosed in U.S. Pat. No. 3,734,889 are useful as components of curable systems containing an epoxy resin or an isocyanate. These tertiary amines are liquid, non-phenolic in composition, are clear in color, have little or no odor, and have no formaldehyde content.

More specifically, tertiary amine derivatives for use herein disclosed in U.S. Pat. No. 3,734,889, which is expressly incorporated herein by reference, are condensation reaction products of a) from 2 to 3 mols of a polyamine having only one primary amino group and only one tertiary amino group, and a non-cyclic backbone containing from 1 to 18 carbon atoms, and b) one mol of at least one of urea, guanidine, guanylurea, thiourea, and a mono-N or di-N,N' alkyl substituted urea or thiourea having from 1 to 3 carbon atoms in the alkyl moieties.

The polyamine of component a) may have more than 2 amino groups, although diamines are preferred. The carbon chain backbone must be non-cyclic, has between 1 and 18 carbon atoms, and can be branched or straight chain, saturated or unsaturated. Examples of useful polyamines include, but are not limited to:
methylethylaminolaurylamine,
dimethylaminopropylamine,
methyl bis (3-aminopropyl) amine,
methyl bis (3-aminoethyl) amine,
N-(2-aminoethyl) piperazine,
dimethyltriethylenetetramine,
diethylaminopropylamine,
aminodiethylaminostearyl alcohol,
N,N bis (propylaminoethyl) butylenediamine,
aminotripropylamine,
dimethylaminoalyliamine, and
diethanolaminododecylamine.

Preferred polyamines for use herein are di-($C_1$-$C_6$ alkyl)amino alkyl amines, especially those in which the alkyl amine group contains from 2 to 6 carbon atoms. Most preferred compounds are dimethylaminoethylamine and dimethylaminopropylamine, i.e. those in which the alkyl group contains 2 or 3 carbon atoms.

The preferred condensation reaction products are the reaction products of urea or thiourea with a di-($C_1$-$C_6$ alkyl)amino $C_1$-$C_{18}$ alkyl amine, and especially with a dimethylamino ($C_2$-$C_6$ alkyl amine, i.e a compound of the formula

wherein n is an integer of from 2 to 6, preferably 2 or 3, and X=O or S.

The above condensation reaction products can be prepared by heating together from 2 to 3 mols of the polyamine component a) with 1 mol of the difunctional component b) at an elevated temperature, e.g. at a temperature in the range of from 115° C. to 215° C. until the condensation reaction is nearly complete, usually within about 5 hours. Specific methods of preparation can be found in Examples I, IV, and X in U.S. Pat. No. 3,734,889 and Example 2B hereinafter. The curable epoxy resin systems in which the present condensation reaction products can be used are two component systems that react when blended, either with or without external heat.

In the two component epoxy resin systems, one component comprises an epoxy resin, e.g. the reaction product of epichlorohydrin and an aromatic polyol such as bisphenol A, a Novolac resin, or an aliphatic polyol such as glycerol; a linear or cyclic polyolefin epoxidized with peracetic acid; or glycidyl esters of polycarboxylic acids.

The second component comprises a curing agent (hardener) which acts as a cross-linking agent. Typical curing agents are primary and secondary aliphatic polyamines, including amidoamines, as well as mercaptans and anhydrides, although the use of anhydrides as curing agents usually require the use of relatively high curing temperatures. Preferred curing agents are polyfunctional mercaptans. Polymercaptans are described in U.S. Pat. No. 4,177,173 (Carr). Polymercaptans typically have an average mercaptan functionality of from just greater than about 1.5, more typically from about 2.0 to about 6, e.g. 2.5 to about 4.5. In addition to the curing agents, the second component often contains a catalyst.

The polymercaptan component must have an —SH functionality greater than one. Although the molecules of the polymercaptan component can contain more, e.g., up to about ten—SH groups per molecule, the polymercaptan should be virtually free from molecules having only one —SH group. However, mono—SH compounds can be present in low amounts as modifiers and flexibilizers. Additionally, the polymercaptan component should have an average molecular weight between about 100 and 20,000. Mercaptans having an —SH functionality greater than one but which have molecular weight below about 100 form products which can be undesirable because of their high volatility and noxious odor while polymercaptans having molecular weights above about 20,000 can be highly viscous and difficult to formulate with fillers, pigments and the like.

Exemplary, although not limiting are one or more of the following polymercaptans.

Useful polymercaptans are those prepared from polyepoxides having an epoxy functionality greater than one, i.e., the number of epoxy groups contained in the average polyepoxide molecule is greater than one. Such polyepoxides are converted to polymercaptans by reaction with hydrogen sulfide or by first converting the epoxide groups to halohydrin groups and thereafter reacting the halohydrin groups with a sulfhydrate such as sodium sulfhydrate or potassium sulfhydrate.

Polyepoxides which can be used in forming the polymercaptans include the reaction product of a halogen-containing epoxide such as an epihalohydrin with an aliphatic polyhydric alcohol, e.g., glycerol, pentaerythritol, 1,2,6-hexanetriol, or 1,3,5 pentanetriol. Since secondary alcohols are formed, it is then necessary to reform the epoxide ring by further reaction with caustic. Suitable epoxides for reaction with hydrogen sulfide can also be formed by reaction between aromatic polyhydric phenols such as resorcinol, catechol or bisphenol and halogen-containing epoxide such as an epihalohydrin or 3-chloro-1,2 epoxybutane and by reacting a polyhydric phenol or aliphatic polyhydric alcohol with a polyepoxide compound such as bis (2,3,-epoxypropyl) ether, bis (2,3,-epoxy-2-methylpropyl) ether. Since secondary alcohols are formed, in the first instance, it is then necessary to reform the epoxide ring by further reaction with caustic.

Other suitable polyepoxides as intermediates for polymercaptans include esters of epoxy acids and polyhydric alcohols or phenols containing three or more hydroxyl groups, for example, esters of 2,3,-epoxypropionic acid reacted with glycerol or with 1,2,6-hexanetriol and esters of 3,4-epoxybutanoic acid and polyvinyl alcohol. Other polyepoxides are those esters of epoxy alcohols and polycarboxylic acids containing three or more carboxylic groups, e.g., triglycidyl ester of 1,2,4-butanetricarboxylic acid, triglycidyl esters of 1,3,6-hexanetricarboxylic acid and glycidyl ester of pyromellitic.

Polymercaptans which can be added as an admixture with polymercaptans formed from the above-described polyepoxide precursors and which for economy and efficiency advantageously form only about 20 weight percent or less of the total polymercaptan component include resins prepared from the reaction of hydrogen sulfide with polythiuranes. Other polymercaptans which can be mixed with the polymercaptans derived from the above-described precursors include epoxidized polymers and copolymers of compounds such a isoprene and butadiene which have been reacted with hydrogen sulfide across the double bonds such as limonene dimercaptan as well as mercaptoethyl esters of polyacrylic acid and mercaptobutyl esters of copolymers prepared from methacrylic acid and styrene.

Preferred polymercaptans are those prepared by initially reacting a polyhydric alcohol such as 1,2,6-hexanetriol, glycerol, trimethylol propane or pentaerythritol with an alkylene oxide, such a propylene oxide or ethylene oxide, there usually being a substantial molar excess of alkylene oxide present during reaction. Thereafter the resulting polyoxyalkylene-modified polyhydric alcohol is reacted with a halogen containing epoxide, e.g., an epihalohydrin or 3-chloro-1,2-epoxybutane, to prepare a halogenated polyhydric polyether from which the corresponding mercaptan polymer is obtained by reaction with a metallic sulfhydrate such a sodium sulfhydrate. Such resins include those disclosed in U.S. Pat. No. 3,258,495 (Le Fave et al.). These polymercaptans usually have an average molecular weight range of from about 1,000 to about 7,000 and —SH functionality between about 2.0 and about 6.

Other useful polymercaptans are tris (mercaptoalkyl) cyclohexanes such as 1,2,4-tris (2 mercaptoethyl) cyclohexane and 1,3,5-tris (2-mercaptoethyl) cyclohexane.

Another group is polymercaptoalkyl esters of polycarboxylic acids containing at least eighteen carbon atoms prepared by reacting mercapto alcohols containing up to ten carbon atoms with the appropriate polycarboxylic acids such as those commonly referred to as polymeric fatty acids.

Other examples are polymercaptans having at least three mercaptan substituted side chains attached to one or more aromatic rings such as the following:
1,2,3-tri (mercaptomethyl) benzene
1,2,4-tri (mercaptomethyl) benzene
1,3,5-tri (mercaptomethyl) benzene
1,3,5-tri (mercaptomethyl)-4-methyl benzene
1,2,4-tri (mercaptoethyl)-5-isobutyl benzene
1,2,3-tri (mercaptomethyl)-4,5-diethyl benzene
1,3,5-tri (mercaptomethyl)-2,6-dimethyl benzene
1,3,5-tri (mercaptomethyl)-4-hydroxy benzene
1,2,3-tri (mercaptobutyl)-4,6-dehydroxy benzene
1,2,4-tri (mercaptomethyl)-3 methoxy benzene
1,2,4-tri (mercaptoethyl)-4-aminoethyl benzene
1,3,5-tri (mercaptobutyl)-4-butoxy benzene
1,2,4,5-tetra (mercaptomethyl)-3,6-dimethyl benzene
1,2,4,5-tetra (mercaptoethyl)-3,6-dimethoxy benzene
1,2,4-tri (mercaptomethyl)-3-(N,N-dimethylamino) benzene
1,3,5-tri (mercaptobutyl)-4-(N,N-dibutylamino) benzene
1,2,4,5-tetra (mercaptomethyl)-3-6 dehydroxy benzene
3,4,5-tri (mercaptomethyl) furan
2,3,5-tri (mercaptoethyl) furan
2 butyl-3,4,5-tri (mercaptomethyl) furan 3,4,5-tri (mercaptomethyl) thiophene
2,3,5-tri (mercaptomethyl) thiophene
2-isobutyl-3,4,5-tri (mercaptoethyl)thiophene
3,4,5-tri (mercaptobutyl) pyrrole
2,3,5-tri (mercaptomethyl) pyrrole
2,4,6-tri (mecaptomethyl) pyridine
2,3,5-tri (mercaptomethyl) pyridine
2,4,6-tri (mercaptomethyl)-5-butyl pyridine
2,4,6-tri (mercaptomethyl-5-vinyl pyridine
2,3,5-tri (mercaptobutyl)-4-alkyl pyridine
2,3,5-tri mercaptomethyl) thionaphthene
2,3,5-tri (mercaptomethyl) quinoline
3,4,6-tri (mercaptomethyl)isoquinoline.

Other examples of these compounds include, among others, the poly (mercaptoalkyl) substituted benzenes, the poly (mercaptoalkyl) substituted naphthalenes, the poly (mercaptoalkyl) substituted bisphenyls, the poly (mercaptoalkyl) substituted bis (phenyl) alkanes, poly (mercaptomethyl) bis (hydroxyphenyl) alkanes, the poly (mercaptoalkyl) substituted bis (hydroxyphenyl) sulfones, poly (mercaptomethyl) substituted bis (phenyl) sulfone, the poly (mercaptoalkyl) substituted bis (hydroxyphenyl) sulfides, the poly (mercaptoalkyl) substituted bis (hydroxyphenyl) oxides, poly (mercaptoalkyl) substituted bis phenyl oxides, poly (mercaptoalky) substituted bis (chlorophenyl) alkanes and the like. Specific examples include, among others:
4-mercaptomethylphenyl-4',5'-dimercaptomethyl-phenylmethane
2,2-bis(4,5-dimercaptomethylphenyl) propane
2,2-bis(4,6-dimercaptobutylphenyl) butane
4-mercaptomethylphenyl-3',4'-dimercaptomethylphenyl oxide 4-mercaptomethylphenyl-3',4'-dimercaptomethylphenyl sulfone
2,2-bis (4,5-dimercaptoethylphenyl) sulfide
the 3,4-dimercaptomethylphenyl ester-of-carbonic acid
the 3,4,-dimercaptoethylphenyl ester of maleic acid
1,3,5-tri (mercaptomethyl)-2,4,6-trimethylbenzene
2,2-bis (3-butyl-4,5-dimercatoethylphenyl) hexane
1,3,5-tri (4-mercapto-2-thiabutyl) benzene
1,3,5-tri (4-mercapto-2-oxabutyl) benzene
2,3,-bis (4,5-dimercaptobutyl-3-chlorophenyl) butane
4-mercaptobutylphenyl-3',4'-dimercaptomethylphenyl oxide
3-mercaptobutylphenyl-2',4'-dimercaptobutylphenyl oxide.

Additional polymercaptants include the trioxanes, trithianes, dioxathianes, oxadithianes, oxazines, triazines, thiazines, dithiazines, dioxarsenoles, oxathiazoles, dithiazoles, triazoles, dioxalanes, isoxazoles, isothiazoles, dioxaborines, dioxazines, thiodiazines, and the like, which have at least three mercapto-substituted radicals attached to the said rings.

Specific examples of these include, among others:
2,4,6-tris (beta-mercaptoethyl) 1,3,5-trioxane
2,4,6-tris (beta-mercaptoethyl) 1,3,5-trithiane
2,4,6-tris (mercaptomethyl) 1,3,5-trioxane
2,4,6-tris (mercaptomethyl) 1,3,5-trithiane
2,4,6-tris (beta-mercaptoethyl) 1,3-dioxa-5-thiane
2,4,6-tris beta-mercaptoethyl) 1-oxa-3,5-dithiane
2,4,5-tris (beta-mercaptoethyl) 1,3-dioxalane
2,4,6-tris (alpha-methyl-beta-mercaptoethyl) 1,3,5-trioxane
2,4,6-tris (beta-methyl-beta-mercaptoethyl) 1,3,5-trithiane
2,4,6-tris (beta-mercaptobutyl) 1,3,5-trioxane
2,4,6-tris (beta-mercaptohexyl) 1,3,5-trithiane
2,4,6 tris (beta-phenyl-beta-mercaptoethyl) 1,3,5-trioxane
2,4,6-tris (beta-cyclohexyl-beta-mercaptoethyl) 1,3,5-trioxane
2,4,6-trimercapto 1,3,5-trioxane
2,4,6-trimercapto, 1,3,5-trithiane
2,4,6-tris (1 -thia-4-mercaptobutyl) 1,3,5-trioxane
2,4,6-tris (1-oxa-4-mercaptobutyl) 1,3,5-trioxane
2,3,6-tris (beta-mercaptoethyl) 1,4-oxazine
2,4,6-tris (3-mercaptopropyl) 1,3,5-triazine
2,4,6-tris (mercaptomethyl) 1,3,5-triazine
2,4,6-tris (beta-mercaptomethyl) 1-thia-3-5-diazine.

Examples of polymercaptans containing at least four—SH groups are polymercapto-substituted ethers such as tri (2,3-dimercaptopropyl) ether of glycerol, di (3,4-dimercaptobutyl) ether of diethylene glycol, di (2,3-dimercaptohyexyl) ether of 1,4-butanediol, di (2,3-dimercaptocyclohexyl) ether of 1,5-pentanediol, tri (2,3-dimercaptopropyl) 1,2,6-hexanetriol, di (2,3-dimercaptopropyl) ether of sulfonyldipropanol, di (2,3,-dimercaptopropyl) ether of 1,4-dimethylbenzene, tri(2,3-dimercaptobutyl) ether of trimethylpropane, poly (2,3,-dimercaptopropyl) ether of polyalkyl alcohol, di (3,4-dimercaptobutyl) ether, di (2,3-dimercaptopropyl) ether, di (2,3-dimercaptopropyl) ether of resorcinol, di (3,4-dimercaptohexyl) ether of resorcinol, tri (3,4-dimercaptoctyl) ether of 1,3,5-trihydroxybenzene, di (2,3-dimercaptopropyl) ether of 2,2-bis (4-hydroxyphenyl) propane, di (3,4-dimercaptobutyl) ether of 2,2-bis (4-hydroxyphenyl) butane, tetrakis (2,3-dimercaptopropyl) ether of 1,1,2,2-tetra (4-hdyroxyphenyl) ethane, tetrakis (3,4-dimercaptobutyl) ether of 1,1,5,5-tetra (4-hydroxylphenyl) pentane, di (3,4-dimercaptohexy) ether of 2,2-bis (4-hydroxyphenyl) sulfone, di (3,4-dimercaptobutyl) ether of 2,2 bis (4-hydroxy-5-methoxyphenyl) 1,1-dichloropane and the like.

Other examples include the polymercapto-substituted esters, such as di(2,3-dimercaptopropyl) phthalate, di(3,4-dimercaptobutyl) tetrachlorophthalate, di (2,3-dimercaptopropyl) terephthalate, di (3,4-dimercaptohexyl) adipate, di (2,3-dimercaptobutyl) maleate, di (2,3-dimercaptopropyl) sulfonyldibutyrate, di (3,4-dimercaptooctyl) thiodipropionate, di (2,3-dimercaptohexyl) citrate, di (3,4-dimercaptoheptyl) cyclohexanedicarboxylate, poly (2,3-dimercaptopropyl) ester of polyacrylic acid and poly (2,3-dimercaptopropyl) ester of polyacrylic acid. Particularly useful polymercaptoesters are the reaction product of a polyol and a monobasic carboxylic acid having mercaptan functionality, e.g. pentaerytritol tetra (mercapto-propionate).

The condensation reaction products of the invention are preferably added to the second component of the epoxy resin system containing the curing agent, although they can alternatively be added to the mixture at the time the two components are mixed to produce the cured product. The condensation reaction products are added in a quantity of from 1 to 20% by weight, preferably from 2 to 10% by weight, and most preferably from 2 to 6% by weight, based on the weight of epoxy resin. It has been noted that water sensitivity tends to occur when quantities in excess of 10% by weight are employed; hence quantities of 10% or less are preferred.

During curing the condensation reaction products exhibit a catalytic effect, i.e. produce a more rapid cure and/or a lower cure temperature, e.g. room temperature and a cure time of less than five minutes, and in addition become part of the cured product so that the product is free of foreign substances that do not add to the strength of the polymeric product.

The invention is not dependent on the particular epoxy resin or curing agent selected for the curable epoxy resin system.

While the condensation reaction products of the invention are effective catalysts when used alone in epoxy resin systems, other catalysts can of course be added if desired.

It has also been discovered that the condensation reaction products can be used alone with or without any other curing agents or catalysts to produce a cured product with the epoxy resin component at relatively low curing temperatures and curing times, i.e. at curing temperatures as low as 0° C., e.g. from just less than 20° C. down to about 0° C. When used alone without any other curing agents or catalysts, the condensation reaction products are used in quantities of from 1 to 20% by weight, preferably from 2 to 10% by weight, and more preferably from 2 to 6% by weight, based on the weight of epoxy resin. Here again, the present invention is not dependent on the particular epoxy resin selected for the curable system. Also, while not at all necessary for producing an effective cure, other catalysts can be added to the system if desired.

The compositions containing the epoxy resin and the condensation reaction products can be used in the same manner as other epoxy adhesives and surface coatings, e.g. as protective coatings, i.e. as protective coatings for containers, pipes, tank liners, floors, walls, etc. The resulting cured epoxy adhesives and coatings exhibit excellent adhesive strength, toughness, chemical resistance, and flexibility.

Curable systems containing an isocyanate, i.e. systems for producing polyurethanes, are comprised of a polyisocyanate which can be aliphatic, alicyclic or aromatic, usually a diisocyanate, and a hydroxyl containing material such as a polyol. Polyurethane fibers are advantageously produced by the reaction between hexamethylene diisocyanate and 1,4-butanediol. Polyurethanes used as coatings are typically formed from prepolymers containing isocyanate groups, such as toluene diisocyanate and 4,4'-diphenylmethane diisocyanate, and hydroxyl containing materials such as polyols and drying oils. Polyurethane elastomers are typically formed from the reaction between polyisocyanates and linear polyesters or polyethers containing hydroxyl groups. Polyurethane foams are usually derived from polyethers such as polypropylene glycol and a diisocyanate in the presence of water or a blowing agent such as trifluoromethane.

In all of the above curable systems the presence of a catalyst is useful in reducing the curing times.

The condensation reaction products of the invention are added to the curable systems containing an isocyanate in an amount of from 0.05 to 3% by weight, preferably from 0.1 to 1.0% by weight, based on the weight of active ingredients in the curable system. The condensation reaction products of the invention act solely as catalysts and do not become part of the polyurethane polymer products. As with the epoxy resin systems, the invention is not dependent of the particular isocyanate or hydroxyl containing material selected, although the catalysts of the invention are most effective with aromatic diisocyanates. When aliphatic or alicyclic diisocyanates are used, small quantities, e.g. 0.2% by weight, based on the weight of reactive components, of dibutyl tin dilaurate or other stannous salts, such as stannous octoate should also be present, or alternatively, relatively high cure temperatures or longer curing times should be employed. Curing of these systems can be carried out in the presence of the catalysts of the invention at temperatures in the range of 20° C. to 150° C.

When used in the present application, the term "activating quantity" includes the quantity of condensation reaction product that produces a catalytic effect in isocyanate containing systems; the quantities thereof that produce a catalytic and/or activating effect in epoxy resins systems that contain a curing agent; and the quantities thereof that produce a cured product in epoxy resin systems that do not contain a separate curing agent or catalyst.

The invention will be illustrated but not limited by the following examples.

EXAMPLES

In the following Examples 1–6 (except for 2B), the condensation reaction product of the invention used therein is the reaction product of 2 mols of dimethylamino propyl amine and 1 mol of urea, i.e. the reaction product N,N'-bis(3-(dimethylamino)propyl)-urea. This reaction product was prepared by the process of Example I of U.S. Pat. No. 3,734,889. The reaction product was obtained as a clear liquid, with a slightly yellow tinge.

EXAMPLE 1

An epoxy resin system consisting of diglycidyl ether from the reaction of epichlorohydrin and bisphenol A (EEW=182–192) and CAPCURE® 3-800 (a trifunctional mercaptan terminated compound having a mercaptan value of 3.3 meq/g) Henkel Corporation, Ambler, Pa. were mixed together using an equivalent ratio of epoxy groups to —SH groups, and 4% by weight, based on the weight of the epoxy resin, of the following catalysts set forth in Table 1 were added to equal quantities of the above mixture. Curing was carried out at room temperature. The gel times in minutes are also given in Table 1.

TABLE 1

| CATALYST | GEL TIME (min) |
| --- | --- |
| N,N'-bis(3-(dimethylamino)-propyl) urea | 3.75 |
| THANCAT ®DD[1] | 2.88 |
| CAPCURE ®EH-30[2] | 4.17 |

[1]THANCAT ®DD is 3-(2-(dimethylamino)ethoxy),-1-N,N-dimethylamino-propane, marketed by the Texaco Company.
[2]CAPCURE ®EH-30 is 1,3,5-tri(dimethylaminomethyl)phenol, marketed by Henkel Corporation, Ambler, Pa.

EXAMPLE 2

A) A series of epoxy resin systems consisting of 25 g. of diglycidyl ether from the reaction of epichlorohydrin and bisphenol A, and 35 g of CAPCURE ® 3-800 were formulated by mixing together the above components at room temperature. To each mixture there was added one of the catalysts set forth in Table 2 in a quantity of 4% by weight, based on the weight of the epoxy resin. The gel times in seconds were recorded and are also set forth in Table 2.

B) N,N-bis(3-(dimethylamino)propyl)thiourea was prepared as follows: To a reaction kettle was added 152.2 g (2 moles) thiourea and 449.6 g (4.4 moles) dimethylaminopropylamine and heated to about 145° C. for 10 hours. Thereafter, excess amine was stripped from the reaction mass, The resulting product was a clear amber liquid with a Brookfield viscosity of 2,500 cps at 25° C. using spindle #3 at 12 rpm.

To the epoxy resin system of part A) above, 4% by weight of N,N-bis( 3-(dimethylamino)propyl)thiourea was added and, the gel time in seconds recorded. The resulting gel time is set forth in Table 2.

TABLE 2

| Catalyst | Gel Time (seconds) |
|---|---|
| N,N'-bis(3-(dimethylamino)propyl)urea | 225 |
| N,N'-bis(3-(dimethylamino)propyl)thiourea | 290 |
| THANCAT ®DD (Texaco) | 173 |
| CAPCURE ®EH-30 (Henkel) | 250 |
| N,N-dimethylaminopropyl-2 pyrrolidone (GAF) | 270 |
| dimethylaminopropyl amine (Texaco) | 150 |
| dimethylethanolamine (Dow) | 225 |

The results set forth in Table 2 are quite unexpected. The condensation products of the invention exhibit surprisingly fast gel times considering their lower tertiary nitrogen content compared to commercial tertiary amine products. The following table shows the % tertiary nitrogen content and the gel times obtained in Table 2 above for the two products of the invention and two commercial products for comparison purposes.

| COMPOUND | % Tertiary Nitrogen | Gel Times, sec |
|---|---|---|
| N,N'-bis(3-(dimethylamino)propyl)urea | 12.2 | 225 |
| N,N'-bis(3-(dimethylamino)propyl)thiourea | 11.4 | 290 |
| THANCAT ®DD | 16.1 | 173 |
| CAPCURE ®EH-30 | 15.8 | 250 |

EXAMPLE 3

A urethane system consisting of a diisocyanate and glycerine ethoxylate (9EO) were mixed in a 1:1 NCO-:OH equivalent ratio. Catalysts were added to samples of the above mixture at a level of 1% by weight, based on the combined weight of the diisocyanate and the glycerine ethoxylate. The diisocyanates and catalysts used in each mixture are set forth in Table 3, together with the gel times in minutes when the mixtures were heated to 70° C.

TABLE 3

| Catalyst | Gel Time (minutes) at 70° C. | | |
|---|---|---|---|
| | TDI[2] | MbCHI[3] | IPDI[4] |
| N,N'-bis(3-dimethyl-amino)propyl urea | 15.0 | NG[5] | NG |
| DABCO ®-DMEA[1] | 18.0 | NG | NG |
| THANCAT ®-DD | 6.0 | NG | NG |
| CAPCURE ®EH-30 | 13.5 | NG | NG |
| dibutyl tin dilaurate | 1.0 | 1.5 | 2.0 |
| none | 90 | NG | NG |

[1]DABCO ®DMEA = diazabicyclo (2.2.2) octane-dimethylethanolamine, sold by Air Products and Chemicals, Inc., Allentown, Pa.
[2]TDI = toluene diisocyanate
[3]MbCHI = methylene bis(cyclohexyl isocyanate)
[4]IPDI = isophorone diisocyanate
[5]NG = No gel at this temperature (70° C.) after 180 minutes

EXAMPLE 4

A urethane system was prepared containing 46.5% by weight of a high molecular weight diol, i.e. a hydroxy terminated polybutadiene resin (OH no.=42.1 mg KOH/g), 18.6% by weight of a low molecular weight tetraol, i.e. pentaerythritol propoxylate (OH no.=550 mg KOH/g), 1.9% by weight water, 0.9% polydimethylsiloxane, 0.2% by weight dibutyl tin dilaurate, 0.2% by weight of a catalyst, and 31.7% by weight of toluene diisocyanate (NCO:OH ratio of 1.25). The above ingredients were mixed together and allowed to react at 25° C. After reaction, the foam height was measured. The catalysts used, the reaction times in minutes, and the foam heights in centimeters are set forth in Table 4.

TABLE 4

| Catalyst | Reaction Time (min) | Foam Height (cm) |
|---|---|---|
| N,N'-bis(3-dimethylamino)propyl urea | 2.0 | 6.7 |
| DABCO ® | 2.0 | 3.5 |
| THANCAT ®DD | 2.0 | 6.4 |
| CAPCURE ®EH-30 | 2.0 | 6.3 |

EXAMPLE 5

A urethane system was prepared containing 46.5% by weight of the high molecular weight diol of Example 4, 18.6% by weight of the low molecular weight tetraol of Example 4, 1.9% by weight water, 0.9% polydimethylsiloxane, 0.2% by weight dibutyl tin dilaurate, 0.2% by weight of a catalyst, and 31.7% by weight of toluene diisocyanate (NCO:OH ratio of about 1.25). The above ingredients were mixed together and allowed to react at 25° C. After reaction the foam height was measured. The catalysts used and the foam heights in centimeters are set forth in Table 5.

TABLE 5

| Catalyst | Foam Height, cm |
|---|---|
| N,N'-bis(3-(dimethylamino)propyl) urea | 6.6 |
| CAPCURE ®EH-30 | 6.3 |
| DABCO ® | 6.1 |
| THANCAT ®DD | 5.7 |

EXAMPLE 6

Urethane systems were prepared containing the following components:

33.0 g. glycerine+9 mol PO
1.2 g. H$_2$O
0.1 g. catalyst
0.1 g. stannous octoate
15.5 g. toluene diisocyanate (80% 2,4 isomer+20% 2,6 isomer)

The catalyst employed, the reaction times in minutes, and the foam heights in centimeters are set forth in Table 6.

TABLE 6

| Catalyst | Reaction Time, min. | Foam Height, cm. |
|---|---|---|
| N,N'-bis(3-(dimethylamino)propyl) urea | 2.0 | 3.3 |
| N,N'-bis(3-(dimethylamino)propyl) urea | 2.0 | 5.4[1] |
| THANCAT ®DD | 1.5 | 4.8 |
| DABCO ® | 2.0 | 3.5 |

[1]0.6 polydimethylsiloxane added as a foam stabilizer.

We claim:

1. A method of curing an epoxy resin comprising:

preparing a mixture comprised of an epoxy resin and at least one condensation reaction product of a) and b):
- a) from about 2 to about 3 mols of a polyamine having only one tertiary amino group, and a non-cyclic backbone containing from 1 to 18 carbon atoms; and
- b) about 1 mol of at least one member selected from the group consisting of urea, guanidine, guanylurea, thiourea, mono -N alkyl substituted urea having from 1 to 3 carbon atoms in the alkyl moiety, di —N,N' alkyl substituted urea having from 1 to 3 carbon atoms in the alkyl moieties, mono-N alkyl substituted thiourea having from 1 to 3 carbon atoms in the alkyl moiety and di- N,N' alkyl substituted thiourea having from 1 to 3 carbon atoms in the alkyl moieties; and
- c) a polymercaptan curing agent, and curing said mixture at a temperature below room temperature.

2. A method of claim 1 wherein said curing is at a temperature from 20 degrees celsius to 0° C.

3. A method of claim 2 wherein said curing is at a temperature of 0° C.

4. A method of claim 1 wherein said reaction product is the reaction product of a di (C$_1$-C$_6$ alkyl) amino C$_2$-C$_6$ alkyl amine and urea.

5. A method of claim 1 wherein said reaction product has the formula:

wherein n is an integer of from 2 to 6, and X is O or S.

6. A method of claim 5 wherein n=2 or 3.

7. A method of claim 1 wherein the activating quantity of the condensation reaction product is from about 1 to about 20% by weight, based on the weight of epoxy resin.

8. A method of claim 7 wherein the activating quantity is from about 2 to about 10% by weight.

9. A method of curing an epoxy resin comprising preparing a mixture comprised of an epoxy resin, a polymercaptan curing agent and from 2 to 6% by weight of N,N'-bis(3-(dimethylamino)propyl) urea, and curing said mixture at a temperature below room temperature.

10. A method of claim 9 wherein said epoxy resin has an epoxide equivalent weight of from about 182–192 and said polymercaptan curing agent is a trifunctional mercaptan.

11. A method of curing an epoxy resin comprising:
preparing a mixture comprised of an epoxy resin and at least one condensation reaction product of a) and b);
- a) from about 2 to about 3 mols of a polyamine having only one tertiary amino group, and a non-cyclic backbone containing from 1 to 18 carbon atoms; and
- b) about 1 mol of at least one member selected from the group consisting of urea, guanidine, guanylurea, thiourea, mono -N alkyl substituted urea having from 1 to 3 carbon atoms in the alkyl moiety, di -N,N' alkyl substituted urea having from 1 to 3 carbon atoms in the alkyl moieties, mono-N alkyl substituted thiourea having from 1 to 3 carbon atoms in the alkyl moiety and di- N,N' alkyl substituted thiourea having from 1 to 3 carbon atoms in the alkyl moieties;
- c) a polymercaptan curing agent, and curing said mixture at a temperature from less than 20° C. to about 0° C.

* * * * *